Figure 1:
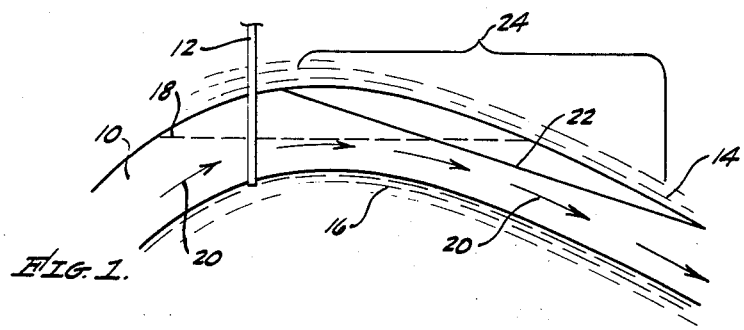

Aug. 2, 1960

V. A. JOSENDAL ET AL 2,947,359

METHOD AND APPARATUS FOR DETERMINING
DIRECTION OF FLUID FLOW IN BOREHOLES

Filed April 8, 1957

2 Sheets-Sheet 1

INVENTORS
VIRGIL A. JOSENDAL,
RICHARD J. STEGEMEIER,

BY

ATTORNEY.

Aug. 2, 1960
V. A. JOSENDAL ET AL
2,947,359
METHOD AND APPARATUS FOR DETERMINING
DIRECTION OF FLUID FLOW IN BOREHOLES
Filed April 8, 1957
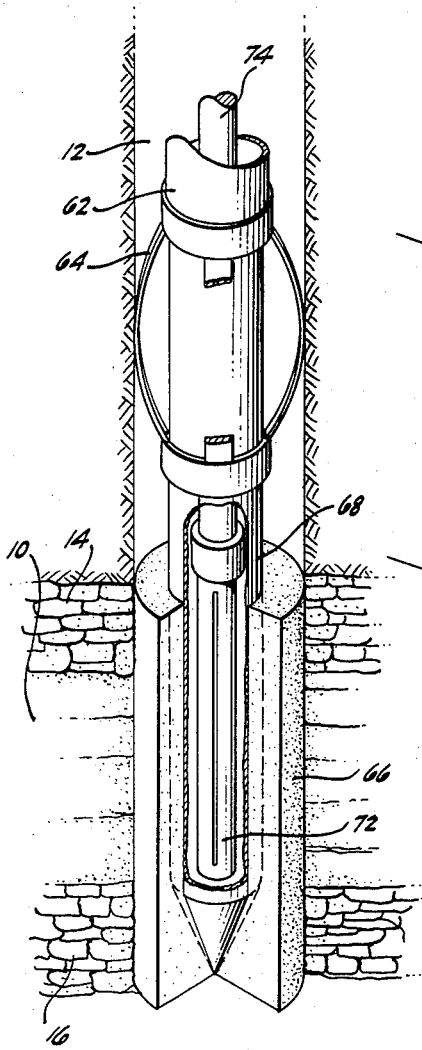
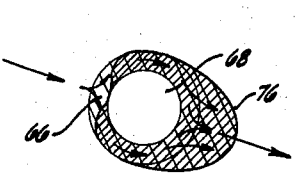
FIG. 8a.
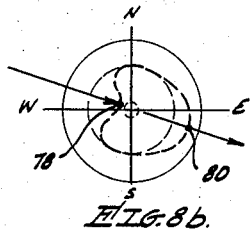
FIG. 8b.
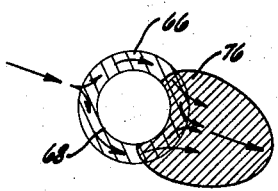
FIG. 9a.
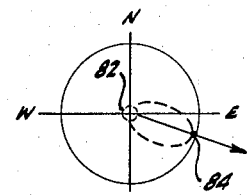
FIG. 9b.
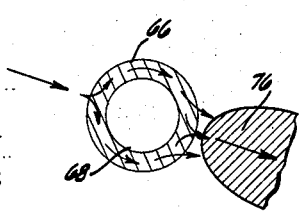
FIG. 10.
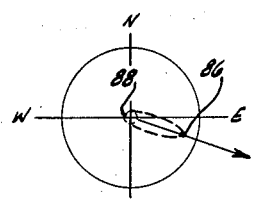
FIG. 10b.
INVENTORS.
VIRGIL A. JOSENDAL,
RICHARD J. STEGEMEIER,
BY
ATTORNEY.

United States Patent Office 2,947,359
Patented Aug. 2, 1960

2,947,359

METHOD AND APPARATUS FOR DETERMINING DIRECTION OF FLUID FLOW IN BOREHOLES

Virgil A. Josendal, Pomona, and Richard J. Stegemeier, Fullerton, Calif., assignors to Union Oil Company of California, Los Angeles, Calif., a corporation of California Filed Apr. 8, 1957, Ser. No. 651,396

8 Claims. (Cl. 166—4)

This invention relates to underground geophysical exploration by means of bores drilled into the earth's crust and particularly relates to an improved method and apparatus for the detection of the direction of flow of groundwater through fluid permeable underground formations in connection with geophysical exploration for crude oil and gas deposits and the like.

Crude petroleum and gas are frequently found trapped in arching geological structures known as anticlines. Fluids are contained in the porous and permeable rock layer such as sandstone which arches upwardly underneath an overlying layer of impermeable rock. Any gas which may be present usually exists as a cap at the top and a layer of petroleum saturates the permeable formation immediately below the gas cap. Further down in the formation is the groundwater or brine also usually present with the gas and the oil.

Frequently the anticlinal structures have plural arches connected to each other in a series which generally slope from one end to the other of the series. In other words, the peaks of each of the connected anticlines in a given direction may be successively higher or lower in a given direction with a general change in height that may vary on the order of 100 to 800 feet per mile.

In such sloped structures the groundwater tends to flow, having a source perhaps in a mountainous region at the high end from which water drains through the anticlinal structure toward a sink of one sort or another at the lower end. The net movement of the groundwater through the permeable rock below the oil and gas layers trapped beneath each anticline exerts hydrodynamic forces on the oil and tends to move it in a direction of the groundwater flow down the structure from the position at which it would otherwise be expected just beneath the arch. For this reason wildcat well bores drilled in unproven territories into an anticline crest, which is located by any of the many well-known geophysical exploration methods, frequently will exhibit traces of oil and gas but no sufficient amount to constitute commercial production. There is otherwise no other available criteria to determine the most likely direction to drill the next well into the deposit of oil and gas possibly displaced by these forces. The flow velocities are of the order of 0.1 inch per day and the pressure gradient associated with this flow is of the order of $3 \times 10^{-6}$ pounds per square inch per foot. Obviously these minute velocities and pressure gradients are immeasurable by any of the conventional means under well bore conditions.

The present invention therefore is directed to a method for determining the flow direction of such underground fluids by placement of a radioactive fluid and the detection and analysis of its movement in and near the well bore.

It is therefore a primary object of this invention to provide a method and apparatus for the determination of the direction and approximate flow rate of underground fluid flow which moves through underground permeable strata.

It is an additional object to determine the appropriate location for additional wildcat well bores on the basis of a determination of the flow direction of groundwater located in permeable strata penetrated by a previous well bore.

It is a specific object of this invention to improve the efficiency of the discovery of crude petroleum and other valuable materials by means of wildcat wells through the selection of additional well sites after a determination of the direction of groundwater flow in a previously drilled well bore.

Other objects and advantages of the present invention will become apparent to those skilled in the art as the description and illustration thereof proceed.

Briefly the present invention comprises determination of the direction of underground fluid flow such as groundwater, located in permeable strata penetrated by a well bore, through the addition of a radioactive ingredient into the flowing fluid in said strata. The radioactive fluid is introduced into an annular test zone in the region of the intersection of the well bore and the permeable strata. Subsequently measurements by means of a directional radioactivity detector located centrally at the axis of the annulus are made to record the change in radioactive intensity with time and azimuthal direction from the well bore. Even with the very low flow rates of groundwater existing in such permeable strata, the radioactive ingredient will be carried away from the well bore through the strata in the direction of groundwater flow. The elapsed time may vary from one to about 30 days. The radioactive ingredient will thus be displaced from that portion of the annular test zone facing toward the source of groundwater flow and will be carried into that part of the strata facing in the direction of groundwater flow from the well bore. The radioactive intensity as determined by a directional detector will first show a decrease in intensity when the detector is pointed toward the source of groundwater flow and the intensity increases temporarily in the diametrically opposite direction. Plotting the data thus taken on polar coordinates indicates the flow direction of groundwater at the well bore. It also indicates the most likely direction along the permeable structure at which a deposit of gas and oil, displaced by the hydrodynamic effects of groundwater flow, will most likely be found.

The application of the method of this invention eliminates from consideration approximately three-fourths of the possible directions from an original drilling site in which new wells might be drilled. Accordingly the time and expense consumed in determining the exact location of a gas and oil deposit are hereby substantially reduced.

Figure 2:
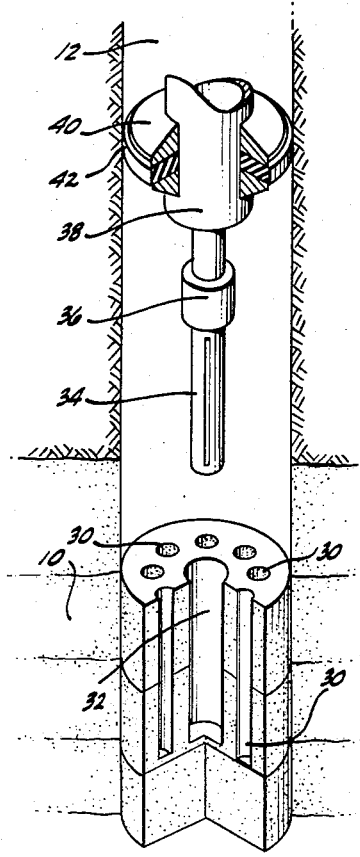

The method of the present invention and suitable apparatus which may be employed to carry it out will be more readily understood by reference to the accompanying drawings in which:

Figure 1 is a schematic illustration of an anticlinal structure in which hydrodynamic forces of the groundwater flow have displaced a gas and oil deposit, Figure 2 is an isometric view of the bottom of a well bore at the point where it penetrates an underground permeable stratum through which a lateral flow of groundwater occurs, Figures 3A through 6B illustrate schematically the gradual movement of fluid containing a radioactive ingredient by means of the groundwater flow and the radioactive intensity plotted on polar coordinates as detected under such conditions, Figure 7 shows an apparatus for effecting the directional detection of radioactivity migration, and Figures 8A through 10B show the radioactivity migration and the polar coordinate plots of the detected radioactivity with the apparatus shown in Figure 7.

Referring now more particularly to Figure 1, an arching structure 10 of permeable rock is penetrated by well bore 12. This arching structure is known as an anticline and is overlain by one or more layers of fluid impermeable rock 14 and underlain by other non-fluid-containing layers 16. The specific gravity of petroleum gas and oil is nearly always less than that of the brine which constitutes the groundwater frequently associated with it. Accordingly these hydrocarbon materials migrate upwardly and tend to collect in anticlinal traps such as that shown in this figure. Because of the fluid impermeable stratum 14 the accumulation of petroleum ordinarily exists above broken line 18. In the absence of groundwater flow this line 18 constituting the lower extremity of the petroleum deposit will be substantially level or horizontal. When however the groundwater flows in the direction indicated by arrows 20, the hydrodynamic effect of such flow is to displace the petroleum deposit to the right in permeable stratum 10 so that it occupies the position indicated between line 22 and the lower surface of impermeable stratum 14. Line 22 is not necessarily straight, but it does represent in general the displacement of an oil deposit.

There are many geophysical methods for locating the approximate position of an anticlinal structure. Once the approximate location of the structure is determined, the site for drilling well bore 12 at or near the crest is readily picked. If the petroleum deposit were undisplaced, then well bore 12 would be expected to produce commercial quantities of petroleum. However, with the deposit displaced into a position embraced in bracket 24, well bore 12 drilled at approximately the crest of the anticline will show little more than traces of oil and gas. The present invention is directed to the use of well bore 12 to determine the direction of groundwater flow and the most likely direction of displacement of the gas and oil so that a logical direction for drilling further wells may be picked with the first well as a reference point.

Referring now more particularly to Figure 2, an enlarged isometric view of well bore 12 is shown at a point where it penetrates fluid permeable stratum 10. After well bore 12 has been drilled into stratum 10 an appreciable distance and it is determined that commercial deposits of oil and gas have not been encountered, the conventional drilling tools are removed from the hole and replaced with a smaller and eccentric drill bit by means of which a plurality of small sample holes 30 are drilled beyond the bottom of the well bore at points spaced substantially along a circle somewhat in from the borehole wall forming the annular test zone. In addition, a central monitoring hole 32 is drilled to approximately the same depth as the sample holes. If desired, these holes may be drilled in the opposite order and the drill bit employed to drill the surrounding sample holes may be also provided with a channel through it for introducing a radioactive ingredient into each sample hole. Finally, a rotatable directional radioactivity detector 34 is introduced into the borehole and placed in monitoring hole 32 at the test zone axis.

Detector 34 is connected by means of coupling 36 to an enclosure 38 suspended from the surface by means of a wire line or a tubing string or the like. Preferably a fluid packer or seal 40 including a compressible flexible seal element 42, and a tubing centralizer such as is indicated in Figure 7, are disposed immediately above detector 34. In Figure 2 packer 40 is disposed immediately above the sample and monitoring holes and radioactivity detector 34 is located in the central monitoring hole 32. Thus the lateral flow of groundwater will cause the radioactive ingredient placed in each sample hole to migrate slowly in the general direction of the groundwater flow. By means of the directional detector this migration is determined and from it the direction of groundwater flow is ascertained.

In Figures 3 through 6 there appear four pairs of associated schematic diagrams. In Figures 3A through 6A there appears a schematic cross section of the permeable strata showing monitoring hole 32 surrounded by a plurality of sample holes 30. In the corresponding Figures 3B through 6B the detected radioactive intensity is plotted on polar coordinates showing the data from which the migration is detected.

Figure 3A:
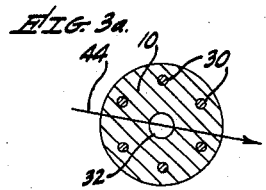
Figure 3B:
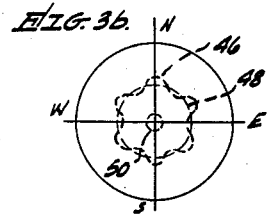

Referring now more particularly to Figure 3A, the approximately circular portion of permeable stratum 10 which is embraced in an imaginary extension of the borehole walls around the sample and monitoring holes is shown. The cross hatched sample holes 30 indicate sample holes in which the radioactive ingredient has been injected. Arrow 44 indicates the flow direction of groundwater, a direction which is about S80°E (south 80° east). Rotation of the radioactivity detector 34 in monitoring hole 32 gives a radioactive intensity variation, which is directly proportional to the amount of radioactive material and inversely proportional to the distance, indicated as curve 46, and the average is indicated by curve 48. It should be noted that the detector indicates peaks and nulls corresponding to the direction of each of the individual sample holes from the central monitoring hole. With a greater number of sample holes, an initial intensity corresponding substantially to average curve 48 is obtained. Curve 50 indicates approximately the value of the normal background radiation.

Figure 4A:
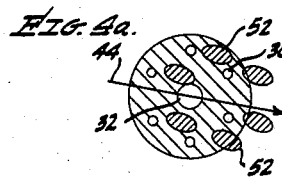
Figure 4B:
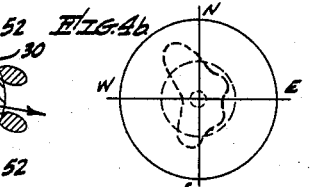

Figures 4A and 4B indicate the situation existing after the elapse of 3 or 4 days' time in the normal case. It is seen that the radioactive ingredients have migrated in the groundwater flow direction from each of the corresponding sample holes. The presence of the concentrated radioactive ingredient is indicated in Figure 4A as cross hatched areas 52. In Figure 4B is plotted on polar coordinates the detected intensity determined for the condition indicated in Figure 4A. A relatively high intensity is indicated to the NNW (north northwest) and the SSW (south southwest) corresponding to the proximity of the radioactive ingredient flowing from the two upstream sample holes 30. At this premature stage however it is not possible with only 6 activity centers to determine accurately the direction of groundwater flow. With a larger number of activity centers, however, the curve of Figure 4B will be sufficiently smooth that the direction of groundwater flow can be determined at this stage.

Figure 5A:
Figure 5B:
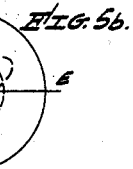

Referring now to Figure 5A, the condition existing after about 7 days' delay is indicated in which the radioactive ingredients have migrated somewhat further from their original positions as indicated by cross hatched areas 54. In Figure 5B the radioactive intensity plotted on polar coordinates is indicated corresponding to Figure 5A. High radioactive intensity to the NE and the SE appear and it is possible at this stage to estimate the groundwater flow direction due to the approach of the detected radioactivity to the normal background level toward the west. The data at this stage indicate roughly a generally west to east flow direction.

Figure 6A:
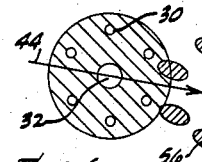
Figure 6B:
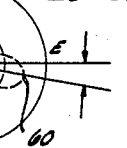

Referring to Figure 6A, the position of the radioactive ingredient is indicated schematically by cross hatched areas 56 and it appears that substantially all of the material has progressed beyond the most easterly sample holes 30. In Figure 6B the determined radioactive intensity is plotted on polar coordinates for the situation existing as indicated in Figure 6A. The null point 58 toward the west and the maximum point 60 toward the east may now be connected by a line drawn through them and the center of the chart indicating a flow direction of about S80°E.

The data thus determined after an elapse of some 15 days indicates, in conjunction with traces of petroleum oil and gas found in the well bore, that the most likely direction in which to locate a new well bore is in a direction about 10° south of due east from the present well site. The net flow of ground-water in that direction in an anticlinal structure tends to displace the petroleum deposit in that direction. Accordingly, it is unlikely that wells drilled to the north, south or west of this site will locate the deposit, but it is likely that wells drilled to the east and particularly along a line 10° south of east will locate it.

Referring now more particularly to Figure 7, a form of apparatus is shown which does not require the drilling of sample or monitoring holes beyond the bottom of well bore 12.

In Figure 7 permeable stratum 10 is shown overlain by an impermeable stratum 14 and underlain by an impermeable or other stratum 16. Tubing string 62 is provided with a tubing centralizer 64, which may be any of the commercially available types, and is also preferably provided with a packer immediately below centralizer 64 but which is not shown for purposes of clarity of illustration. It corresponds however to the packer 40 shown in Figure 2.

By means of a bailer operated on a sand line or by means of a tubing string to which is connected sand packing tools, or by any other means, a sand pack 66 is disposed in borehole 12 in the region where it intersects the permeable stratum. Subsequently tubing string 62 with the associated centralizer 64 and the packer such as is shown in Figure 2 is run into the hole and into the sand pack, thereby displacing the pack into the annular shape shown in Figure 7 and forming the annular test zone. To facilitate this injection the tubing string 62 is preferably provided at its lower end with a hollow lance 68 within which the radioactivity detector rotates and which has a lower pointed end. In the reverse procedure the lance may be positioned first and the sand pack placed subsequently by any of the many well known sand or gravel pack placement procedures. In any event, the lance is preferably constructed of a material which does not inhibit or substantially reduce the radioactive intensity so that when rotating detector 72 supported by means 74 within tubing string 62 is run into position in the lance opposite the sand pack, it detects the radioactive intensity without substantial reduction.

The sand pack as placed preferably contains the radio-active ingredient corresponding to that applied in the method described in connection with Figure 2. Suitable ingredients are hereinafter more fully described. The lateral flow of groundwater from the permeable formation into and through the annular shaped sand pack causes again an analogous migration of the radio-active ingredients from the sand pack off into the permeable strata. The changes in detected radioactivity with azimuth indicate the direction of groundwater flow very rapidly.

In Figures 8A through 10B typical flow patterns and radioactive data plotted on polar coordinates are shown. In Figure 8A the groundwater migration from a direction of about N75°W enters the annular sand pack 66 from a westerly direction and the flow is generally peripheral around lance 68 through the annulus and then in an easterly direction off into the permeable strata from the annulus. The partially displaced radioactive ingredient is indicated in Figure 8A within the cross hatched envelope 76.

In Figure 8B the corresponding intensity data are ploted on polar coordinates, a line drawn through null point 78 and maximum point 80 indicating the general direction of flow.

In Figure 9A the radioactivity envelope 76 has migrated largely out of annular sand pack 66 and in Figure 9B the easterly intensity has dropped to the background level to the null point 82 and the maximum point 84 in conjunction therewith indicates the same flow direction.

In Figure 10 the radioactivity envelope has migrated completely from annular sand pack 66 and in Figure 10B the corresponding data plotted on a corresponding polar coordinate indicates a decreased maximum 86 with the same null point 88 in the easterly direction. Thus the test has continued until an intensity substantially above the initial background value is found in one radial direction only, and that is downstream toward the apparent sink. The flow direction indicated by this method may vary somewhat with time from the beginning of a given run, but the variation is slight and substantially from the very first set of data taken after about one to 4 days' elapsed time from the placement of the radioactive sand pack and the lance, the same flow direction is indicated.

The radioactivity detector referred to in the above descriptions may be a conventional Geiger-Muller counter manufactured in the form of a cylinder with the window provided longitudinally along one side in the form of a slot. Preferably the counter tube is surrounded with a shield also having longitudinal slot radially aligned with the counter tube window in order that the detector be provided with directional characteristics. The radioactivity detector may also comprise any of the several forms of scintillation detectors preferably modified so that they detect radioactivity originating in a restricted direction. Any of these elongated forms of detectors are placed as described centrally within the volume of material to be logged and the detector is rotated so that the window points at all times in a known direction. Commercially available equipment can be used for such orientation. If desired, the rotation may be synchronized with a rotation of a polar coordinate chart in a recording instrument located at the surface, but since the time involved in completing a log, according to this invention, is somewhat extended there is adequate time for intermittent rotation, radioactive counter determination, and hand recording.

Several types of radioactive materials are suitable for use in the practice of this invention. Preferably water soluble materials, such as the inorganic salts, bases, or acids, or organic materials such as alcohols, aldehydes, ketones, bases and acids, produced from the radioactive elements are used when the flow of groundwater is to be determined and recorded. Clearly if the method is intended to be used to determine the flow of petroleum oil for example, then oil soluble organic materials should be substituted. The same considerations apply in the determination of the flow of other possible fluids. With respect to groundwater flow determination, radioactive materials are preferred which do not tend to be adsorbed on sandstone or by the sand pack, or on the argillaceous or clayey materials which are found in some underground permeable formations or a sufficient quantity is used over and above the quantity so lost by adsorption. Suitable radioactive elements in the practice of this invention include iodine 131, bromine 82, selenium 75, cesium 134, cerium 144, praseodymium 144, indium 192, antimony 124, cobalt 60, and the like. Some of the suitable water soluble materials suitable for use in this invention are as follows: potassium iodide, potassium bromide, selenic acid, cesium chloride, antimony chloride, cobalt chloride, bromoethyl alcohol, etc.

The extent to which radioactivity is imparted for purposes of logging, or in other words, the added concentration of radioactive materials, depends upon several factors, including the sensitivity of the detector, the general geometry including the length of the sample and monitoring holes or the depth of the sand pack, the diameter of the bore at the point where radioactive monitoring takes place, and the like. Since the background radiation normal with oil-containing sandstone ranges between about $2 \times 10^{-12}$ and about $100 \times 10^{-12}$ grams of radium equivalent per gram of rock, preferably sufficient radioactive material is incorporated either in the sample holes or in the sand pack to give an initial radiation count at the detector of the order of at least 5 to 10 times the maximum background count as a minimum. The quantity of material added also depends upon the radioactivity of the material employed and the distance between the detector and the surrounding sand containing the added radioactive ingredient. Thus little may be said with respect to these materials specifically as to the quantity required. It is however readily determinable from the nature of the system and the nature of the radioactive materials selected. This should be done in each instance in order to give initial radioactivity of the order mentioned.

The radioactive material may be injected through the drills by means of which the sample holes are formed. The radioactive material may also be injected into the sample holes by any one of a variety of means including the injection of the material into each hole by means of a lance at the bottom of a tubing string which is rotated into alignment with each of the sample holes. When the sand pack modification is employed the sand to be disposed in the well bore may first be mixed with a solution of the radioactive material to form a moist mass of sand in which the radioactive material is quite uniformly dispersed. This sand is then formed into a pack in the hole according to any of the usual sand pack procedures. In another modification, the dry radioactive material which is water soluble is incorporated dry in the sand mix. The dry material is then packed into the well bore so that the radioactive material dissolves slowly and migrates with the transverse flow of groundwater. Other suitable methods will occur to those skilled in the art from the foregoing suggestions. The important consideration is merely that the radioactvity be in any event fairly uniformly distributed throughout the mass of fluid-permeable material.

It is not a requirement however that an absolute uniformity of distribution be realized. The description of Figures 3B through 6B and 8B through 10B presuppose an initial uniformity of radioactivity for purposes of clear illustration. There will invariably be however some non-uniformity in distribution. This problem is readily overcome by plotting relative radioactive intensity on the polar coordinates, that is, reducing subsequent radioactivity determinations for a given direction to percentages or fractions of the initially determined radioactivity in that direction. The migration may then be readily followed in spite of any initial known uniformity of the radioactivity.

From the data determined according to the method of the present invention and applying known geometric and hydrodynamic relations, the change of the detected variable with time also serves to give an indication of the flow rate of the groundwater through the region of the intersection of the permeable strata and the borehole. With groundwater flows which are relatively rapid, the return of the condition to the norm corresponding to the presence of groundwater in the sand pack is relatively rapid. In the opposite case when this flow is relatively slow the change in the measured variable is relatively slow. Knowing the required time for this variation, one may readily estimate the flow velocities.

It is apparent from the practice of the present invention as described above that the location of nearby deposits of gas and oil and other valuable fluids found in underground permeable strata, has been improved. It is contemplated in the practice of this invention that the usual geophysical methods will be applied in locating the anticlinal type of structure or other characteristic types of structures in which such valuable fluids are found. It is further contemplated that at least one wildcat well bore will be drilled into this structure so as to expose the permeable strata and render the path of groundwater flow accessible for analysis. The present invention is intended to be used in this analysis, specifically to determine the direction of groundwater flow past the well bore in those cases where traces of valuable fluids have been found in the bore in order to indicate the most likely direction which the main body of these valuable fluids may have been displaced by the groundwater flow.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The method for determining the direction of flow in the horizontal plane of a fluid moving through an underground fluid-permeable stratum penetrated by a borehole, which method comprises coaxially positioning a radiation detector within said borehole opposite said stratum, said detector being capable of scanning around the azimuth, establishing within said borehole and around said radiation detector an annular fluid-permeable solid body containing a radioactive material which is soluble in said fluid, isolating said solid body from the remainder of the borehole, and, after a period of time sufficient for said radioactive material to be displaced radially from said solid body into said stratum substantially only by the hydrodynamic force of said fluid, measuring with said radiation detector the radiation intensity in a plurality of directions around the azimuth.

2. A method according to claim 1 wherein the fluid flow to be determined comprises petroleum, and wherein said radioactive material is oil soluble.

3. A method according to claim 1 wherein said fluid flow to be determined comprises groundwater, and wherein said radioactive material is water soluble.

4. The method for determining the direction of flow in the horizontal plane of a fluid moving through an underground fluid-permeable stratum at the bottom of a borehole, which method comprises drilling into said stratum from the bottom of said borehole a vertical monitoring bore of substantially smaller diameter than said borehole and substantially coaxial therewith, drilling into said stratum from the bottom of said borehole a plurality of vertical sample bores spaced substantially in a circle between said monitor bore and the walls of said borehole, introducing an azimuth-scanning radiation detector into said monitor bore, introducing a radioactive material into each of said sample bores, said radioactive material being soluble in said fluid, isolating said monitor and sample bores from the upper part of said borehole, and, after a period of time sufficient for said radioactive material to be displaced radially from said sample bores into the surrounding stratum substantially only by the hydrodynamic force of said fluid, measuring with said radiation detector the radiation intensity in a plurality of directions around the azimuth.

5. The method of determining the direction of flow in the horizontal plane of a fluid moving through an underground fluid-permeable stratum penetrated by a borehole, which method comprises placing within the borehole a fluid-permeable body of solid granular material, then displacing said body into an annular shape by forcing a hollow lance downwardly into said body substantially along the axis of said borehole, then substantially uniformly distributing within said solid granular material a radioactive material which is soluble in said fluid, positioning an azimuth-scanning radiation detector within said lance, and, after a period of time sufficient for said radioactive material to be displaced radially from said body into said stratum substantially only by the hydrodynamic force of said fluid, measuring with said radiation detector the radiation intensity in a plurality of directions around the azimuth.

6. The method of determining the direction of flow in the horizontal plane of a fluid moving through an underground fluid-permeable stratum penetrated by a borehole, which method comprises positioning a hollow lance within said borehole coaxially therewith and opposite said stratum, positioning a fluid-permeable body of a solid granular material in the annulus between said lance and the walls of said borehole, said body having substantially uniformly distributed therein a radioactive material which is soluble in said fluid, positioning an azimuth-scanning radiation detector within said lance, and, after a period of time sufficient for said radioactive material to be displaced radially from said body into said stratum substantially only by the hydrodynamic force of said fluid, measuring with said radiation detector the radiation intensity in a plurality of directions around the azimuth.

7. An apparatus for determining the flow direction of fluids moving in underground fluid permeable strata penetrated by a well bore which comprises a packer isolating one portion of the well bore opposite said strata from the remainder of said well bore, a substantially annular-shaped body of solid material permeable to said fluids and disposed in the isolated portion of the bore, a radioactive material soluble in said fluids contained in said annular-shaped body of solid material, and a rotatable directional radioactivity detector disposed centrally within said annular-shaped body of solid material to detect the variation in radioactivity along different radii through said annular-shaped body of solid material.

8. An apparatus according to claim 7 wherein said annular-shaped body of fluid permeable solid material comprises a body of granular solids introduced through said borehole from the surface, in combination with a tubular hollow lance suspended from the surface and fabricated of material transparent to the radiations of said radioactive material disposed centrally within said annular-shaped body, said radioactivity detector being rotatable within said lance.

References Cited in the file of this patent
UNITED STATES PATENTS

| | | |
|---|---|---|
| 2,316,361 | Piety | Apr. 13, 1943 |
| 2,339,129 | Albertson | Jan. 11, 1944 |
| 2,358,945 | Teichmann | Sept. 26, 1944 |
| 2,364,975 | Heigl et al. | Dec. 12, 1944 |
| 2,564,198 | Elkins | Aug. 14, 1951 |
| 2,652,496 | Herzog et al. | Sept. 15, 1953 |